US008078961B2

(12) United States Patent
Vion-Dury et al.

(10) Patent No.: US 8,078,961 B2
(45) Date of Patent: Dec. 13, 2011

(54) SGML DOCUMENT VALIDATION USING XML-BASED TECHNOLOGIES

(75) Inventors: Jean-Yves Vion-Dury, Biviers (FR); Jean-Pierre Chanod, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 923 days.

(21) Appl. No.: 12/062,024

(22) Filed: Apr. 3, 2008

(65) Prior Publication Data

US 2009/0254812 A1 Oct. 8, 2009

(51) Int. Cl.
*G06F 17/27* (2006.01)
(52) U.S. Cl. .................................. 715/237; 715/234
(58) Field of Classification Search .................. 715/234, 715/237, 239
See application file for complete search history.

(56) References Cited

U.S. PATENT DOCUMENTS

| | | | |
|---|---|---|---|
| 6,202,072 B1 | 3/2001 | Kuwahara | |
| 6,996,776 B1 | 2/2006 | Makely et al. | |
| 7,188,336 B2* | 3/2007 | Humphries | 717/123 |
| 2003/0208498 A1* | 11/2003 | Feinberg et al. | 707/100 |
| 2008/0028376 A1* | 1/2008 | Kostoulas et al. | 717/143 |
| 2009/0204662 A1* | 8/2009 | Meo | 709/203 |

OTHER PUBLICATIONS

Bauman et al., Migrating Langauge Resources from SGML to XML: the Text Encoding Initiative Recommendations; 2002; Fourth Int. Conf. on Language Resources and Evaluation; LREC'04; pp. 1-5.*
Clark, James, "Namespace Routing Language (NRL)," Thai Open Source Software center Ltd., pp. 1-14, 2003.
Walsh, Norman, "Converting an SGML DTD to XML," XML.com, pp. 1-7, 1998.
"Information Technology—Document Schema Definition Languages (DSDL) . . . ," ISO/IED 19757-4, pp. 1-50, 2006.
Kosek et al., "Relaxed—on the Way Towards True Validation of Compound Documents," 15th Conference on Worldwide Web, pp. 427-436, May 26, 2006.
XML Schema Part 0: Primer Second Edition, W3C Recommendation, at http://www.w3.org/TR/xmlschema-0/, Oct. 28, 2004, pp. 1-68.
XML Schema Part 2: Datatypes Second Edition, W3C Recommendation, at http://www.w3.org/TR/xmlschema-2/, Oct. 28, 2004, pp. 1-102.
Clark, James, "SP: an SGML System Conforming to International standard ISO 8879 . . . ," at http://www.jclark.com/sp/, last visited on Jan. 8, 2008, p. 1.
"Comparison of SGML and XML," W3C note, at http://www.w3.org/TR/NOTE-sgml-xml.html, Dec. 15, 1997, pp. 1-7.
"Adobe FrameMaker," an history on Wikipedia, at http://en.wikipedia.org/wiki/FrameMaker, last visited on Apr. 1, 2008, pp. 1-4.
"XML Schema," Wikipedia article, at http://en.wikipedia.org/wiki/XML_schema, last visited on Apr. 1, 2008, pp. 1-2.
"Relax NG," Wikipedia article, at http://en.wikipedia.org/wiki/RELAX_NG, last visited on Apr. 1, 2008, pp. 1-2.
"SGML Exceptions and SML," ArborText, Inc., at http://www.arbortext.com/resources/exceptions.htm, last visited on Apr. 1, 2008, pp. 1-5.

(Continued)

*Primary Examiner* — Doug Hutton, Jr.
*Assistant Examiner* — Andrew Dyer (57) ABSTRACT

An SGML validation system comprises: an XML validation engine; a translator configured to convert an SGML document to a translated XML document; a set of XML schemas against which the XML validation engine validates the translated XML document, the XML schema set configured such that errors detected by the validation of the translated XML document correspond to SGML errors in the SGML document; and a report generator configured to generate an error report identifying SGML errors corresponding with errors detected by the validation and linking the identified SGML errors with corresponding locations in the SGML document.

20 Claims, 3 Drawing Sheets

OTHER PUBLICATIONS

"News," at http://www.schematron.com, last visited on Apr. 1, 2008, pp. 1-2.

Francois et al., "The Potential of Extensible Markup Language (XML) within the Aeronautical Framework," XML Europe 2001 Conference, May 25, 2001, pp. 1-15.

Clark, J., "Sx", at http://xml.coverpages.org/clarkSX-SP13-980310.htm, Mar. 10, 1998, pp. 1-2.

Ducharme, "Automating SGML -to- XML DTD Conversion (Part 1)," Internet Publication, at http://www.architag.com/tag/Article.asp?v=12&i=10&p=9&s=1&print=yes>, Oct. 1998, pp. 1-4.

Ducharme, "Automating SGML -to- XML DTD Conversion (Part 2)," Internet Publication, at http://www.architag.com/tag/Article.asp?v=12&i=10&p=9&s=1&print=yes>, Nov. 1998, pp. 1-5.

Ducharme, "Filling in the DTD GAPS with Schematron," Internet Publication, at http:///www.xml.com/1pt/a/968>, May 15, 2002, pp. 1-5.

Lee et al., "Comparative Analysis of Six SML Schema Languages," Internet Citation, at http://citeseer.nj.nec.com/lee00comparative.html>, retrieved on Nov 20, 2001, pp. 1-12.

\* cited by examiner

SGML DOCUMENT VALIDATION USING XML-BASED TECHNOLOGIES

BACKGROUND

The following relates to the document processing, storage, publication, and related arts.

Structured document formats are used for business documents, technical documents, and other types of documents. Document structuring structures the document respective to layout and content, and this facilitates machine reading and automated processing such as indexing, searching, clustering, classifying, and other document manipulations.

One structured document format is standard generalized markup language (SGML). The SGML format is generally considered to be a powerful but complex format. SGML is abstract, and requires a document type definition (DTD) to provide specific structuring information. DTD's have been developed at varying levels of standardization for specifying documents of a wide range of different types, for use in the automotive, aerospace, and other industries. Documents in SGML format are used for applications such as technical operator manuals for which the complexity and precision of SGML are advantageous.

Another structured document format is extensible markup language (XML). This format is generally considered to be more straightforward to utilize, and more flexible as compared with SGML. XML formatted documents are constructed in accordance with a schema specifying layout and content. Such schema may be embodied as an associated DTD, or may be expressed in a standardized XML schema such as RelaxNG, Schematron, Namespace-based Validation Dispatching Language (NVDL), or so forth. One aspect of XML flexibility is that multiple schemas can be used in the same document—for example, an XML document may be partly structured in accordance with a DTD and partly in accordance with another schema or plurality of schemas such as RelaxNG and Schematron.

The structural format including the DTD or schema specifies various constraints with which any "well-formed" document should comply. A structured document is constructed to comply with the selected structured format, and is then validated by a validation engine. The validation engine is a software module or the like which verifies that the document satisfies all constraints of the SGML or XML format including related DTD or schema constraints. In some cases, the validation may report an error specifying a document portion or aspect that fails to meet a particular constraint. A given document, such as an aircraft maintenance manual for example, may include hundreds or thousands of pages of text, drawings or images, tables, footnotes, endnotes, drawing reference numbers, and other content associated with a wide range of different content (e.g., different aircraft components and systems, different maintenance processes, and so forth). Accordingly, the validation should provide a report that identifies the location in the document at which the constraint is not met and identifies which constraint is not met. A large document may contain numerous such errors, resulting in a lengthy error report.

XML has become generally more widely used than SGML in applications such as web servers and corporate networks. XML validation engines also have more highly developed capabilities and user friendly interfaces, and can be operated in cascade to validate the XML document against two or more different schemas.

However, SGML remains in substantial use in some areas such as the aerospace industry. In view of the foregoing and other considerations, there is interest in converting SGML documents to XML. For example, the SP SGML system includes an SGML-to-XML converter program called SX, which receives as input an SGML document and outputs an equivalent XML document. The conversion performed by SX performs document validation in SGML using the DTD of the SGML document, and then converts the validated SGML document to an equivalent XML document. This approach entails use of an SGML validation engine. The output XML document is not validated at the XML level, although SX does detect and warn about certain SGML constructs which SX is unable to convert to XML.

In some environments, however, one may not have access to an SGML validation engine. Further, for some applications the objective is not to convert an SGML document to XML, but rather to validate the SGML document using available XML validation tools, but still rely on SGML authoring tools for authoring and maintenance. Existing tools such as SX are not suitable for such applications.

BRIEF DESCRIPTION

In some illustrative embodiments disclosed as illustrative examples herein, an SGML validation system is disclosed, comprising: an XML validation engine; a translator configured to convert an SGML document to a translated XML document; an XML schema against which the XML validation engine validates the translated XML document, the XML schema configured such that errors detected by the validation of the translated XML document correspond to SGML errors in the SGML document; and a report generator configured to generate an error report identifying SGML errors corresponding with errors detected by the validation and linking the identified SGML errors with corresponding locations in the SGML document.

In some illustrative embodiments disclosed as illustrative examples herein, an SGML validation process is disclosed, comprising: translating an SGML document having a tree structure to generate a translated XML document having a corresponding tree structure; validating the translated XML document against an XML schema configured such that errors detected by the validating correspond to SGML errors in the SGML document; identifying SGML errors corresponding with errors detected by the validating; and linking the identified SGML errors with corresponding locations in the SGML document based on the correspondence of the tree structures of the SGML document and the translated XML document.

In some illustrative embodiments disclosed as illustrative examples herein, an electronic storage medium is disclosed storing instructions executable to perform an SGML validation process comprising: translating an SGML document to generate a translated XML document; validating the translated XML document against an XML schema configured such that errors detected by the validating correspond to SGML errors in the SGML document; identifying SGML errors corresponding with errors detected by the validating; and displaying a report indicating the identified SGML errors.

DETAILED DESCRIPTION

Figure 1:
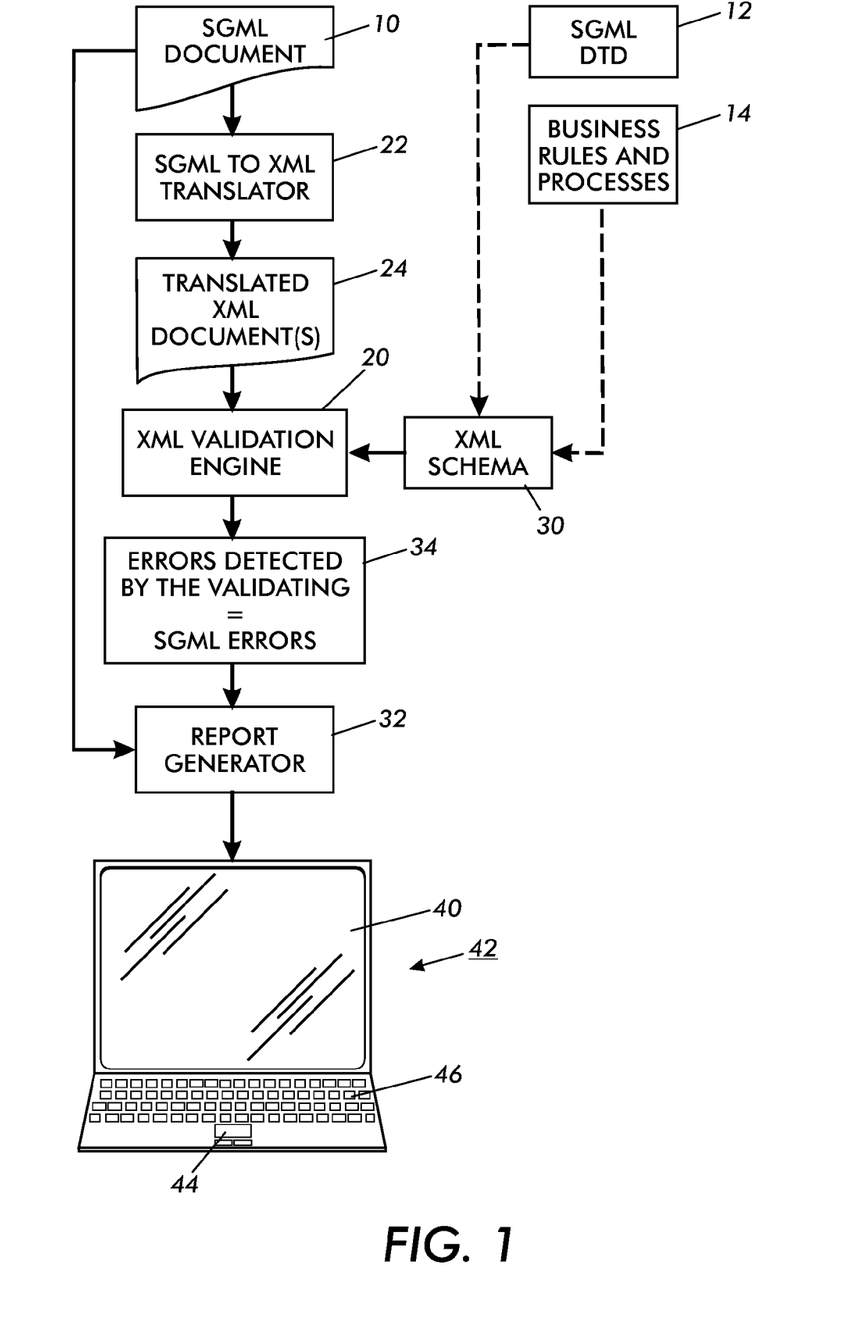
FIG. 1 diagrammatically shows an SGML document validation system employing an XML validation engine.

With reference to FIG. 1, a document 10 substantially conforms with a standard generalized markup language (SGML) document structuring format, and is referred to herein as SGML document 10. As used herein, the term "substantially conforms" denotes that the SGML document 10 is intended to conform with an SGML document structuring standard including document formatting and structuring standards set forth in an SGML document type definition (DTD) 12 and optional additional formatting or structuring rules such as illustrated business rules and processes 14, but that the SGML document 10 may include some errors such that the SGML document 10 deviates in some fashion from well-formed SGML as set forth by the SGML DTD 12 and any associated rules 14.

The SGML document 10 is input to an SGML validation system shown in FIG. 1 for the purpose of validating the SGML document against the SGML standard including the SGML DTD 12 and any associated rules 14. The SGML validation engine of FIG. 1 is designed to make use of an available extensible markup language (XML) validation engine 20 configured to validate XML schema embodied as an XML DTD or expressed in a standardized XML schema such as RelaxNG, Schematron, NVDL, or so forth. Although the XML validation engine 20 is shown in FIG. 1 as a single component, it is to be understood that the XML validation engine 20 may include two or more XML validation engines arranged to process a document serially or in parallel. For example, one such XML validation engine may validate a document or document portions respective to a RelaxNG schema while another XML validation engine may validate the document or document portions respective to a Schematron schema. The term "XML schema" is intended to be broadly construed as encompassing the W3C schema language as well as other de facto or public standard schemas such as RelaxNG, Schematron, NVDL or so fort h.

The XML validation engine 20 is not configured to process SGML documents. Accordingly, the SGML validation system of FIG. 1 includes an SGML to XML translator 22 to convert the SGML document 10 to a translated XML document 24. Although a single translated document is shown in FIG. 1, it is contemplated for the translated XML document 24 to comprise two or more translated XML documents for convenience or to enable use of different XML schema in each translated XML document.

The translation of the SGML document 10 into the translated XML document 24 does not require preservation of specifically presentational properties (i.e. how the document will look after rendering) or logical properties (i.e. how the internal organization of the document is preserved). Rather, for SGML validation purposes, the translated XML document 24 should be handled by validation rules as if it were an SGML document. In some embodiments, the error reporting is suitably based on the original SGML document 10, not on its XML translation 24. Alternatively or additionally, the error reporting may incorporate errors expressed at the XML level, or errors reported in other formalisms or formats. Moreover, XML validation programmers should be able to develop validation rules based on the same mental model rather than the one used for SGML authoring. In order to characterize this notion, the term of p-isomorphism is used herein for the SGML-to-XML translation (denoted T) performed by the translator 22. A transformation is p-isomorphic if it preserves any XPath interpretation over the node-set. An XPath interpretation is a function defined over a set of nodes (according to a formal tree model) and a context node. Mathematically, if a set of node x in the SGML document 10 is selected by an XPath expression p from any context node n, then the same path p will also select the transformed set of node T(x) from T({n}). Note that the SGML-to-XML translation T is defined over the whole set of input nodes, and that it defines a mapping of the source node set over the target node set Based on this formalism, the SGML-to-XML translations satisfy the p-isomorphism properties, based on the idea that an homogeneous tree model holds for SGML parsing tree and XML parsing trees. This implies that ambiguities inherent to the SGML standard are correctly resolved during the parsing and tree construction phase which is always the case for well constructed SGML definitions and well behaving SGML parsers. Note also that this notion of p-isomorphism could be generalized to s-isomorphism, where s symbolizes any abstract node selection language suitable for the selection and manipulation of trees.

However, translation of the SGML document 10 to generate the translated XML document 24 still does not allow the XML validation engine 20 to validate the SGML document 10 respective to the SGML standard and the SGML DTD 12 and associated SGML rules 14. Rather, inputting the translated XML document 24 to the XML validation engine 20 without further action would result in validation of the XML coding of the translated XML document 24, but would not detect numerous types of SGML errors. Moreover, because SGML and XML are not functionally equivalent, some SGML constructs of the SGML document 10 may be incorrectly or incompletely represented in the translated XML document 24. These incorrectly or incompletely represented SGML constructs would also not be detected by the XML validation. Still yet a further problem is that the output of the XML validation engine 20 is a report on errors in the XML coding. For large documents, even if the XML validation detects an error that can in principle be related back to an SGML coding error in the SGML document 10, it may be difficult or impossible for the author of the SGML document 10 to correlate such an error reported by the XML validation engine 20 with the SGML coding error in the SGML document 10.

To overcome these problems, the SGML validation system of FIG. 1 further includes a specially constructed XML schema 30 that is input to the XML validation engine 20, and a report generator 32 that receives and processes the XML validation output 34 generated by the XML validation engine 20.

The XML schema 30 is specially constructed based on the SGML DTD 12 and any associated SGML rules 14, such that when the XML validation engine 20 validates the translated XML document 24 against the XML schema 30, errors detected by such validation correspond to SGML errors in the SGML document 10. In other words, errors detected by validating the translated XML document 24 against the specially constructed XML schema 30 correspond to SGML errors in the original SGML document 10.

The report generator 32 is configured to convert the detected errors to a format compatible with conventional SGML validation and to associate the detected SGML errors with the corresponding coding of the SGML document 10. The output of the report generator 32 is a conventionally formatted XML validation report suitably linked with or referenced to the SGML document 10, and can be displayed on a display device 40 of a user interface 42, or printed on a printing device, transmitted via the Internet or a local area network, or otherwise utilized. This report may contain information allowing a visual reconstruction of whole or contextualized fragments of the original SGML document. In a typical application, the output of the report generator 32 is viewed by the author of the SGML document 10 on the display device 40, the author makes suitable revisions in the SGML document 10 (for example, using a mouse, illustrated touchpad 44, illustrated keyboard 46, or other input device of the user interface 42) to hopefully correct the reported SGML errors, and the thusly revised SGML document is re-validated by the SGML validation system of FIG. 1 until a well-formed SGML document that is free of SGML coding errors is obtained.

The specially constructed XML schema 30 can be generated in various ways. As is known in the art, there are numerous standard SGML DTD and associated rules for use in publication of documents in diverse areas of industry, business, government, and other fields. Such a standardized SGML DTD and associated rules have typically been constructed over a substantial period of time by information technology personnel and other personnel working in the field to which the SGML DTD and associated rules apply, and may comprise hundreds of lines of code, thousands of lines of code, tens of thousands of lines of code, or more. In some approaches, it is contemplated for the specially constructed XML schema 30 corresponding to such an SGML DTD and associated rules to be constructed manually, by a human operator conversant in both SMGL DTD and XML schema. However, manual construction of the XML schema 30 has substantial disadvantages including tediousness, likelihood of introduction of human error into the XML schema, and so forth.

Figure 2:
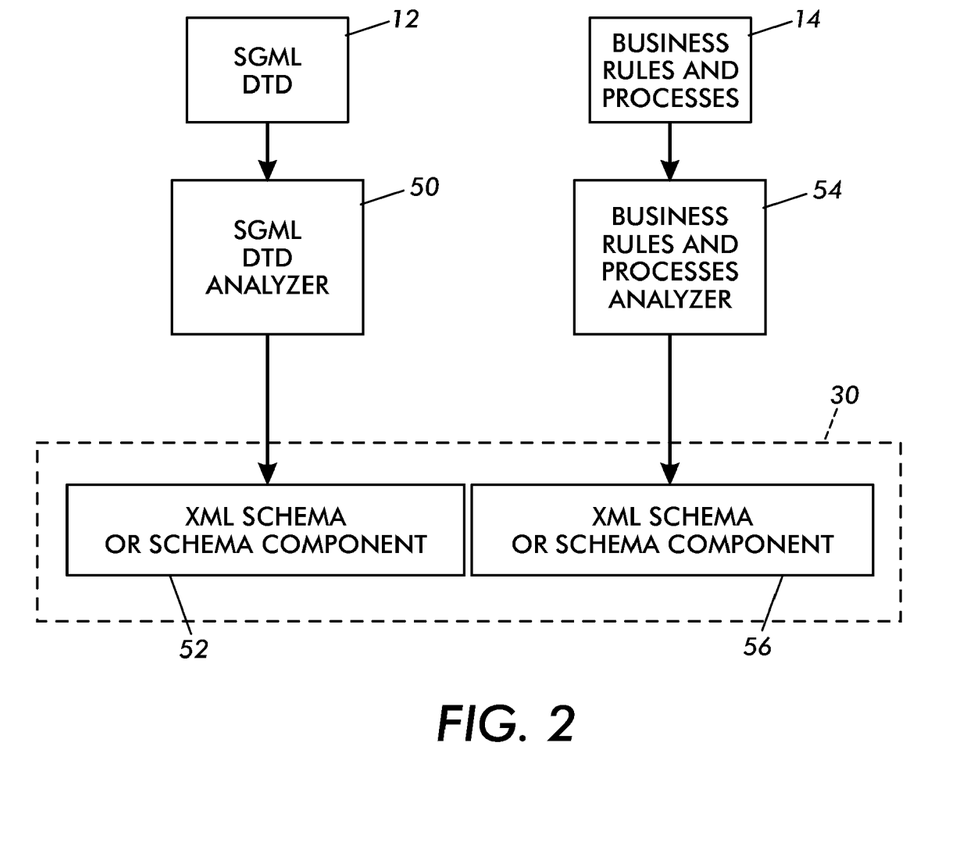
FIG. 2 diagrammatically shows a converter for processing an SGML document type definition (DTD) and associated validation rules to generate an XML schema configured such that errors detected by the validation of the translated XML document correspond to SGML errors in the SGML document.
Figure 3:
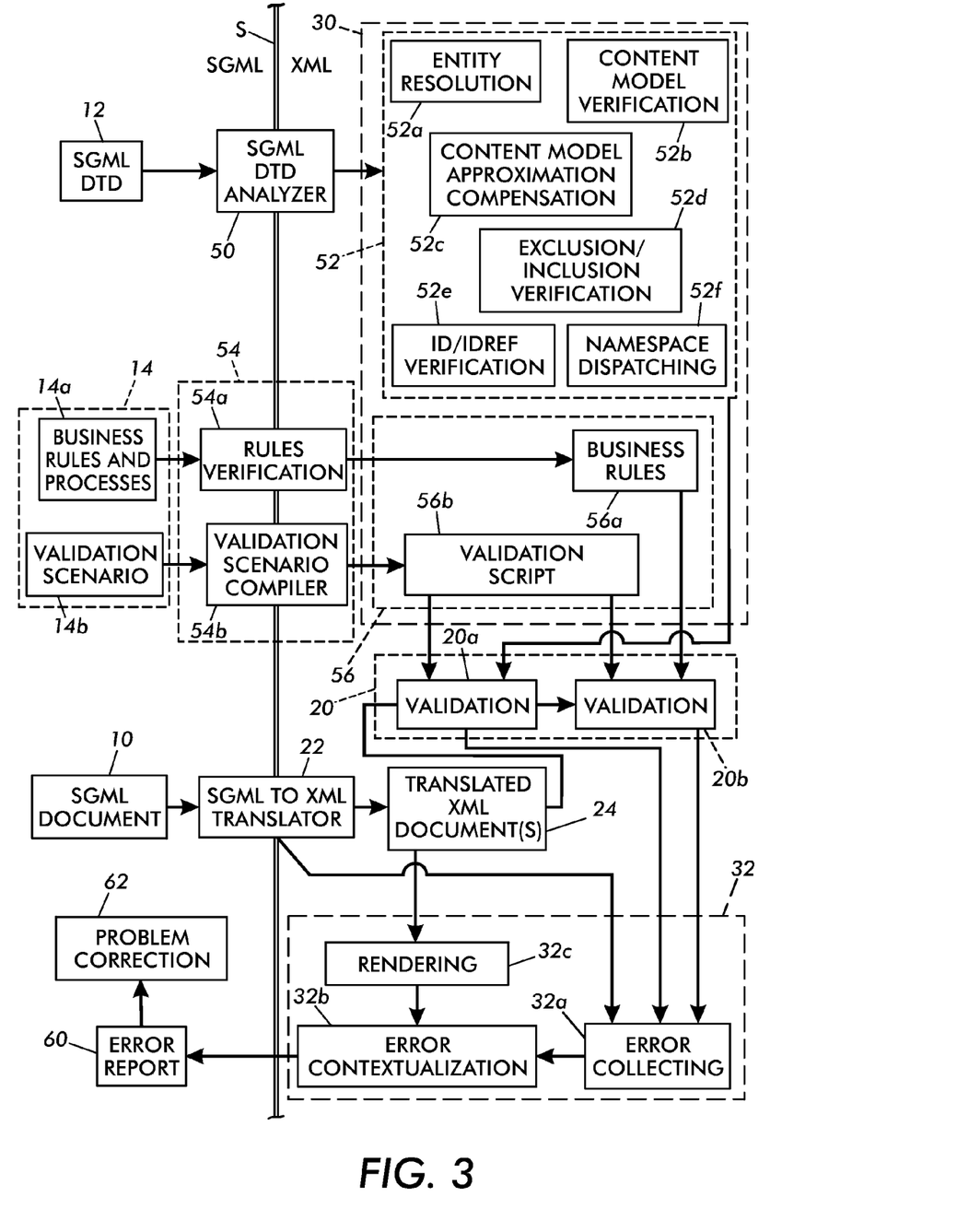
FIG. 3 diagrammatically shows processing details of SGML document validation using the SGML document validation system of FIG. 1.

Accordingly, with reference to FIG. 2 in a preferred approach the construction of the specially constructed XML schema 30 is automated. As shown in FIG. 3, for example, an SGML DTD analyzer 50 receives the SGML DTD 12 and applies conversion rules to generate a corresponding XML schema or schema component 52. In similar fashion, a business rules and processes analyzer 54 receives the business rules and processes 14 and applies conversion rules to generate a corresponding XML schema or schema component 56. The XML schema or schema components 52, 56 collectively define the XML schema 30 shown in FIG. 1. In some embodiments, one or both of the XML schema or schema components 52, 56 may be broken into further sub-components, for example being expressed in different types of standard XML schema such as RelaxNG and Schematron formatting. Alternatively, it is contemplated for the XML schema or schema components 52, 56 to be integrally combined as a single specially constructed XML schema.

The various computational components 20, 22, 32, 50, 54 of FIGS. 1 and 2 can be variously embodied. For example, in some embodiments, a computer, controller, Internet server, or other digital processing device with at least one programmable digital processor is programmed to implement one, some, or all of these components. In some embodiments, a computer readable medium or media such as a magnetic disk, magnetic tape, optical disk, random access memory (RAM), read-only memory (ROM), flash memory, or so forth is or are encoded with instructions that are executable on a computer or other digital processing device to implement one, some or all of the components 20, 22, 32, 50, 54 of FIGS. 1 and 2. More generally, one, some or all of the components 20, 22, 32, 50, 54 can be embodied purely as hardware, for example an analog, digital, or mixed application-specific integrated circuit (ASIC), or as a combination of hardware such as a computer or other digital device and software executable on said hardware, or a combination of such systems or subsystems. In some embodiments, one, some or all of the components 20, 22, 32, 50, 54 may be embodied as part of the user interface 42 in the form of a computer or other electronic processing device with suitable a storage medium or media such as an integral magnetic hard disk drive, optical disk drive, or so forth.

It is to be particularly recognized that the SGML validation system of FIG. 1 on the one hand, and the XML schema generation components 50, 54 on the other hand, can be embodied either together or separately. For example, in some embodiments the SGML validation system of FIG. 1 and the XML schema generation components 50, 54 may both be embodied on a common computer or other digital processing device, or may both be embodied as executable instructions stored on a common storage medium or common set of storage media. In such embodiments, an operator can invoke the XML schema generation components 50, 54 with a given SGML DTD 12 and any associated SGML rules 14 as input so as to generate the corresponding specially constructed XML DTD 30, and then to validate the SGML document 10 conforming with the given SGML DTD 12 and associated business rules and processes 14 using the SGML validation system of FIG. 1 with the specially constructed XML DTD 30.

On the other hand, in some embodiments the SGML validation system of FIG. 1 may be embodied separately from the XML schema generation components 50, 54. For example, the XML schema generation components 50, 54 may be embodied on a computer at a corporate headquarters, while the SGML validation system of FIG. 1 may be embodied on a computer at a regional corporate office separate from (but possibly linked with via the Internet or a corporate digital data network) the computer at the corporate headquarters. In such an example, the XML schema generation components 50, 54 are suitably invoked at the corporate headquarters to generate the specially constructed XML schema 30 for a given application such as airline manuals. The regional corporate office is then supplied with only the SGML validation system of FIG. 1 and the specially constructed XML schema 30, but not with the XML schema generation components 50, 54. The regional corporate office can then validate airline manuals coded in SGML using the SGML validation system of FIG. 1 and the specially constructed XML schema 30.

Having described an illustrative overall SGML validation system with reference to FIG. 1, and the components 50, 54 for specially constructing the XML schema 30 with reference to FIG. 2, a more detailed description of an illustrative SGML validation process using the components 20, 22, 32, 50, 54 of FIGS. 1 and 2 is next described.

FIG. 3 diagrammatically shows the illustrative SGML validation process using the components 20, 22, 32, 50, 54 of FIGS. 1 and 2. In FIG. 3, a separation line S separates operations in SGML, on the left, and operations in XML, on the right. Operations disposed on the separation line S relate to conversions between SGML and XML. Selected components from FIGS. 1 and 2 are also labeled in FIG. 3 to identify components performing or embodying various processes and data structures or data compilations shown in FIG. 3.

The SGML DTD analyzer 50 performs static analysis of the SGML DTD 12 to generate the corresponding XML DTD 52. In the illustrative processing example of FIG. 3, the SGML DTD analyzer 50 analyzes the input SGML DTD 12, and produces the XML DTD 52 as a set of XML schemas or XML schema components 52*a*, 52*b*, 52*c*, 52*d*, 52*e*, 52*f*, each of which addresses an SGML property to be validated. The combined schema set 52*a*, 52*b*, 52*c*, 52*d*, 52*e*, 52*f* is such that it covers the SGML properties to be validated based on the source SGML DTD 12. The XML schemas or XML schema components 52*a*, 52*b*, 52*c*, 52*d*, 52*e*, 52*f* are configured to validate the translated XML document or documents 24 which is or are translations of the conformant SGML document 10. Note that the single SGML document 10 is in some embodiments translated into several translated XML documents 24, representing for example partitioning fragments over the whole SGML document 10. XML schemas or XML schema components 52*a*, 52*b*, 52*c*, 52*d*, 52*e*, 52*f* are further described as follows.

The entity resolution schema or schema component 52*a* is configured to verify external entities and notation references. The content model verification schema or schema component 52*b* addresses content model verification, that is, checking that all tags are embedded and sequenced in accordance with the content model defined in the SGML DTD 12, and also that attributes such as names and values are also compliant with the SGML DTD 12. The content model approximation compensation schema or schema component 52*c* deals with approximations that optionally may be introduced by the translation of SGML content model constraints into the XML schema language. For instance, if XML DTD is the target XML schema language, then some SGML expressions cannot be mapped with exactly the same semantics, and are accordingly further checked by the compensation schema or schema component 52*c*.

The exclusion/inclusion verification schema or schema component 52*d* addresses two related problems when dealing with SGML DTD. The first one is the verification of exclusion trees, that is, sub-trees that the SGML DTD specifies should not occur at any sublevel. As an example, the following SGML DTD allows embedding footnote elements inside para elements, but the SGML DTD also forbids footnote elements when para is used inside other footnote elements:

```
<!ELEMENT para - - (#PCDATA | footnote)* >
<!ELEMENT footnote - - (#PCDATA | para) -(footnote) >
```

This SGML DTD portion allows the use of paragraphs to structure the content of footnotes, but forbids recursive definition of footnotes as this would not be an appropriate structure, in view of presentational issues.

The second problem addressed by the exclusion/inclusion verification schema or schema component 52*d* is related to inclusion trees, which allow an SGML DTD to admit certain tags at any depth level below another containing tag. For instance, one could enrich the previous SGML DTD above in such a way that para will be legal everywhere in a section element:

```
<!ELEMENT section - - (title?, (#PCDATA | section)*) +(para)>
<!ELEMENT title - - (#PCDATA| footnote)* >
<!ELEMENT para - - (#PCDATA | footnote)* >
<!ELEMENT footnote - - (#PCDATA | para)* -(footnote) >
```

Due to the inclusion tree specified in the first line of this SGML DTD portion, a para element can occur inside of a containing section, title, or para element.

Exclusion trees and inclusion trees are not readily captured using XML schema languages such as XML DTD, RelaxNG or W3C XML Schemas, which are mainly oriented toward content model checking. A suitable approach for capturing these constructs is to use an appropriate schema language, implemented using any appropriate XML language such as Schematron or XSLT scripts.

The ID/IDREF verification schema or schema component 52*e* addresses the verification of ID/IDREF mechanisms, which is to make sure that attributes declared as "ID" are indeed uniquely defined over the document, and that all attributes declared as "IDREF" and the like are indeed pointing to licit tags. The namespace dispatching schema or schema component 52*f* deals with namespace partitioning, and is related to the processing of inclusion trees. This schema or schema component 52*f* can, for example, be based on existing technologies or standards such as Namespace Routing Language (NRL) and NVDL. A core mechanism that allows handling the combinatorial complexity of tree inclusion through namespaces is described later herein. The role of the namespace dispatching schema or schema component 52*f* is to partition the verified document into sub-trees having different namespaces, and to apply different verification sequences to the sub-trees according to the namespace they belong to. In that sense, it performs a first level gluing operation between various schemas.

Processing performed by the business rules and processes analyzer 54 is next considered. For the processing described in this example, the business rules and processes 14 are separated into business rules and processes 14*a* and a validation scenario 14*b*. Other arrangements or divisions of the business rules and processes 14 are also contemplated. Verification and compilation of business rules 14*a* is performed by a rules verification process 54*a*. The business rules 14*a* are constraints over the document that must be expressed in a selected language. Once gathered and modularized, they are written down into the selected language, called the Business Rule Language (BRL) herein for generality. The syntax and the consistency of the BRL can be asserted; if correctly specified, the constraints can be translated into a lower level script which will perform the checks inside the appropriate execution environment. This is called compilation.

Verification and compilation of a validation scenario 14*b* is performed by a validation scenario compiler 54*b*. The validation scenario 14*b* is suitably specified by validation experts and expressed in a selected language that allows describing the sequences of validation steps depending on properties of the SGML documents. Once the syntax and the internal consistency is checked, then the validation scenario can be translated into low-level instructions that will drive the overall validation process, articulating the various checking steps as intended by the validation experts. In one illustrative embodiment, the proposed method could encompass a basic validation script, possibly hidden to the validation experts, which would sequence validation steps in a given order.

Turning now to the SGML to XML translator 22, this component solves certain problems inherent to the SGML and XML formalisms. Some errors are optionally detected at this stage, and routed to the report generator 32. Fatal errors may occur that prevent continuing further validation operations. Once translated, the resulting translated XML document or documents 24 conform with well-formed XML, and the structure of the XML tree of the translated XML document 24 is equivalent to the structure of the SGML tree of the SGML document 10 after parsing and tag minimization resolution. The translation is such that a rendering transformation exists that conveys at least the information needed for reconstructing the original SGML document presentation. The translated XML document 24 also contains enough information for a reverse transformation to be able to reconstruct an SGML document that is similar to the original SGML document 10, where the term "similar" means here that there exists a structural equality between the two SGML trees after parsing, even if not considered as valid after applying the validation scenario.

The operation of the XML validation engine 20 in the illustrative processing example of FIG. 3 is divided into two serially applied validation operations 20*a*, 20*b*. These operations are driven by a script derived from a correct validation scenario. The illustrated validation operations 20*a*, 20*b* can, for example, be performed by sequentially chained validation units or engines. The chaining should be in the order in which the first validation unit applies all schemas derived from the original SGML DTD 12 (that is, applies the XML schema or schema components 52), and the second validation unit applies the schemas derived from the business rules 14 (that is, applies the XML schema or schema components 56), plus optionally other ad-hoc schemas directly written by validation experts according to the whole execution context and SGML-to-XML translation method. The validation can raise either fatal errors that stop further processing, or non-fatal errors.

All errors are collected by an error collecting process 32*a* of the report generator 32. The error collecting process 32*a* collects the various errors coming from the validation steps 20*a*, 20*b*, and any errors generated by the SGML to XML translator 22 during the SGML to XML translation process, and computes dependencies so that the error flow can be simplified through a meaningful reorganization of messages performed by an error contextualization process 32*b* that highlights the most important errors first. The error contextualization process 32*b* relates errors coming from error collecting process 32*a* with a rendered document generated by a rendering process 32*c* that renders the translated XML document or documents 24 in such a way that a comprehensive error report is produced in an SGML compliant format and correlated with the SGML document 10 so as to help the SGML author to fix any problems. The rendering process 32*c* represents the document in such a way that the original SGML tags are reconstituted, and can be easily navigated and correlated with error messages. Such reconstitution in the rendered document is possible because of the p-isomorphic SGML to XML translation performed by the translator 22. In a suitable configuration, the error contextualization process 32*b* establishes hyperlinks between errors and the related tags in the SGML document 10. These hyperlinks allow the SGML author to relate at a glance the error messages and the relevant portions of the SGML document 10. The error contextualization process 32*b* is feasible because information about the source SGML document 10 is preserved during the p-isomorphic SGML to XML translation process performed by the translator 22 and is incorporated into the rendered document output by the rendering process 32*c*.

The output of the error contextualization process 32*b* is an error report 60 which conforms with conventional SGML formatting and with the tree structure and other aspects of the original SGML document 10, so that it is readily read and understood by the SGML author. A problem correction process 62 is then performed by the SGML author, or by an editor or the like, to revise the SGML document 10 to bring the SGML document 10 into conformance with the SGML standard as set forth in the SGML DTD 12 and any associated rules 14. The SGML author or editor makes use of the error report 60 in performing these revisions. (Naturally, if the error report 60 reports no errors, then the problem correction process 62 is suitably omitted).

In performing the SGML validation process diagrammatically shown in FIG. 3, various general categories of constraints that may be encountered in a typical SGML DTD or associated SGML rules are discussed next.

First, we consider verification of exclusion tree constraints of the form:

<!ELEMENT table--((title?, tgroup, ftnote*)
        |graphic+)-(table)>

This SGML declaration is extracted from the Component Maintenance Manual SGML DTD that is in use in the airlines industry. The SGML declaration forbids table embedding, that is, it excludes table sub-trees inside of table sub-trees. This constraint is suitably captured, for example, by the following Schematron rule which is suitably inserted into the content model approximation compensation schema or schema component 52*c*:

```
<rule context="//table">
    <report test="descendant::table">Table embedding forbidden
    </report>
</rule>
```

A second category of constraints is enforcement of under-specified constraints. Such under-specification are artifacts that may appear when translating an SGML declaration like:

<!ELEMENT title--(#PCDATA|sub|super)+>

In order to be recognized as valid by XML DTD processors, such a declaration is suitably translated into the following XML specification:

<!ELEMENT title (#PCDATA|sub|super)*> which however weakens the initial constraint in that it allows empty title elements. Such an under-specified constraint can be handled by systematically inserting Schematron rules into the content model approximation compensation schema or schema component 52*c* that complement the content model checking. An illustrative example of such a Schematron rule is as follows:

```
<pattern name="compensation of title element under-specification">
    <rule context="//title">
        <report test="count(*|text( ))=0">a "title" element cannot be empty
        </report>
    </rule>
</pattern>
```

In this case, checking together the XML DTD and the Schematron rule above is equivalent to checking the original SGML constraint, since DTDs uniquely define the content model for a given element name. This is not the case in RelaxNG or W3C schemas, where an element title can be defined multiple times in different contexts with different content models.

A third category of constraints is enforcement of inclusion tree constraints. One solution appropriate for this type of constraint uses separate namespaces for each inclusion tree. A dedicated RelaxNG schema captures the related content model, and an NVDL schema is used to glue all validation pieces together, in a transparent way.

The following describes a typical application or usage of the SGML validation system of FIGS. 1 and 2. The An SGML authoring application, such as FrameMaker (available from Adobe Systems, San Jose, Calif.), is used by the SGML author to generate the SGML document 10. The SGML authoring application implements either a "what you see is what you get" (WYSIWYG) or source-modification/rendering-visualization interface. The SGML validation system of FIG. 1 is then used to validate the SGML document 10, and constraint violations are reported via the error report 60 with informative messages and references on any erroneous SGML coding in the SGML document 10. In such an application, it is useful to the SGML author for the error report 60 to accurately relate the validation errors to the source SGML document 10.

In the following, the SGML document 10 is denoted as d, the translated XML document 24 is denoted as S2X(d), the rendering transformation performed by the rendering operation 32c is denoted as $R_1$, and a rendering of original SGML document 10 is denoted as $R_1(d)$. It is useful for these elements to satisfy the constraint that $R_1(S2X(d))=R_2(d)$. This implies that the SGML author reviewing the error report 60 will see the output of the rendering operation 32c as if it were a rendering of the original SGML document 10 itself. In practice the symbol "=" in this constraint does not require strict equality, as for instance highlighting fonts or line numbering information could be added to help the error correction process.

In the following, operation of an illustrative example of the SGML DTD analyzer 50 is further described. The SGML DTD analyzer 50 may in some embodiments perform an initial assessment of the SGML DTD 12 and may reject the SGML DTD 12 if it is invalid or inappropriate for the SGML document 10. However, typically the SGML DTD 12 is expected to be valid with respect to construction rules as described by the SGML ISO 8879 standard.

The SGML DTD analyzer 50 generates a dedicated lightweight SGML parser that detects basic SGML syntax errors and solves possible ambiguities in tag minimization. In a preferred approach, this lightweight SGML parser detects relatively few problems during this phase. Typically, it is desired only to ensure that the result will be well-formed XML verifying the previously described p-isomorphism. This means additionally that the lightweight SGML parser solves tag omissions in accordance with the information embedded in the SGML DTD 12, thus reconstructing a correct XML tree with respect to the original intended logical structure. Another alternative is to use such a generic parser, and to generate only the data structures able to drive the parsing process according to the input SGML DTD 12.

Instead of generating a dedicated lightweight SGML parser, it is also contemplated to access a standalone SGML to XML converter, such as the SX converter ("SP: an SGML System Conforming to International Standard ISO 8879—Standard Generalized Markup Language", James Clark, available at http://www.jclark.com/sp/, last accessed Jan. 22, 2008), to perform the SGML parsing. The SX converter performs basic translation operations and enforces content model checking. A redirection mechanism can be used to get error messages from the SX converter.

The SGML DTD analyzer 50 also generates a lightweight XML DTD including entity solving, namespace prefixes capture and default attributes construction. Using such an XML DTD allows the parser component of the SGML DTD analyzer 50 to solve entity references and to check optional attributes in accordance with instantiation rules. In addition to the general entity declaration that may be declared in the lightweight XML DTD, the built-in base set as defined by the SGML standard (for example "*" for the character "*") may be also added to the XML DTD, if not previously handled during the lightweight parser generation. The XML DTD generation phase is optional and may be omitted if, for example, the lightweight SGML parser handles default attribute values and entity resolution, or if another resolving mechanism is used externally.

The SGML DTD analyzer 50 uses the lightweight SGML parser and the lightweight XML DTD in generating the specially constructed XML schema 52, which in some embodiments is divided into two XML schema components: one for modeling an approximated basic content model, slightly more general than the original one, and another one for capturing the content models for all elements appearing in inclusion trees. The accuracy of the first schema component for capturing an approximated content model depends on the XML schema language used in representing the first schema component. If RelaxNG is chosen, then optionally no approximation is done as the expressive power of RelaxNG is sufficient without augmentation. On the other hand, if an XML DTD is used to express the first schema component, then approximations such as that described herein with reference to enforcement of under-specified constraints are typically employed. Note that in this case, the DTD expressing the first schema component could be merged with the lightweight XML DTD previously described.

For the second schema capturing the content models for all elements appearing in inclusion trees, a dedicated target namespaces NS allows modeling elements that are included, but not explicitly mentioned inside a righthand side (RHS) of a DTD rule. This way, the NVDL preprocessor will not withdraw the tree nodes to be checked for conformance to the corresponding element's content model. The captured content model also optionally addresses SGML specific lexical issues through regular expressions such as those offered by the XML Schema data types available within RelaxNG processors. Some illustrative lexical constraints that may occur in the SGML DTD 12, and their translation in the corresponding specially constructed XML schema 30 (in RelaxNG syntax), are summarized in Table 1.

TABLE 1

| SGML lexical categories | | XML Mapping | RelaxNG translation |
| --- | --- | --- | --- |
| Leaf X | RCDATA | <![CDATA[entity-solving(X)]]> | string |
| Leaf X | #PCDATA | X | Text (may require additional check depending on original DTD) |
| Attribute | CDATA | <![CDATA[X]]> | string |
| Attribute | ENTITY | | xsd:ENTITY |
| Attribute | ENTITIES | | xsd:ENTITIES |
| Attribute | CDATA | | xsd:string |

TABLE 1-continued

| SGML lexical categories | | XML Mapping | RelaxNG translation |
|---|---|---|---|
| Attribute | ID | | xsd:ID |
| Attribute | IDREF | | xsd:IDREF |
| Attribute | IDREFS | | xsd:IDREFS |
| Attribute | NAME | | xsd:token {pattern= "[a-zA-Z][a-zA-Z0-9\.-]{0,7}"} |
| Attribute | NMTOKEN | | xsd:token {pattern="[a-zA-Z0-9\.-]{1,8}"} |
| Attribute | NMTOKENS | | list {xsd:token { pattern= "[a-zA-Z0-9\.-]{1,8}"}} |
| Attribute | NOTATION | | xsd:NOTATION |
| Attribute | NUMBER | | xsd:token {pattern="[0-9]{1,8}"} |
| Attribute | NUMBERS | | list {xsd:token {pattern="[0-9]{1,8}"}} |
| Attribute | NUTOKEN | | xsd:token {pattern= "[0-9][A-Za-z0-9\.-]{0-7}"} |
| Attribute | NUTOKENS | | list {xsd:token {pattern= "[0-9][A-Za-z0-9\.-]{0-7}"}} |

The illustrative SGML DTD analyzer 50 also generates, in addition to the RelaxNG schema, another schema expressed in the Schematron language. This Schematron schema checks additional constraints that are not readily captured by the RelaxNG schema. Optionally, a Schematron schema is also generated for checking the scope of tree inclusions and the compliance with exclusion rules. These Schematron schemas could also be replaced by Extensible Stylesheet Language Transformation (XSLT) scripts, for instance to allow better optimization.

Validation against the XML schema or schema component 52 generated by the SGML DTD analyzer 50 provides a basic validation level. Further constraints set forth in the business rules 14 are suitably checked by the additional XML schema or schema component 52 as previously described.

In the following is discussed some suitable solutions for handling the combinatorial complexity induced by inclusion trees. Namespace routing languages such as NVDL rely on a preprocessing transformation that cut down the tree into tree fragments, each of them belonging to homogeneous namespaces. Then, as part of the validation specification, the NVDL schema designer makes explicit which validation operations (defined inside external specifications such as RelaxNG, Schematron or W3C schemas files) are to be applied on which fragments, and if the fragment is to be attached or detached before invoking the validation operations. It is desired to place the original instance inside a root namespace, say SGML, and the sub-trees corresponding to the inclusion trees inside two different namespaces, NS-1 and NS-2. The first namespace, NS-1, is used for inclusion trees that appears explicitly inside a content model as defined in the SGML DTD 12, and the second namespace NS-2 is used for the other sub-trees, those which do not appear in any content model definition. The NS-1 tree fragments are kept attached to the parent tree, so that this one can be fully verified, whereas the NS-2 fragments are detached, so that the main tree will verify tag occurrence without interfering with the inclusion sub-trees. These will be checked separately for content model conformance. The following NVDL specification implements this process:

```
<rules xmlns="http://purl.oclc.org/dsdl/nvdl/ns/structure/1.0">
  <namespace ns="SGML">
    <validate schema="section.rnc" schemaType="application/x-rnc">
      <mode>
        <namespace ns="NS-1">
```

-continued

```
          <validate schema="section.rnc"
            schemaType="application/x-rnc"/>
        </namespace>
        <namespace ns="NS-2">
          <allow/>
          <attach/>
        </namespace>
      </mode>
    </validate>
  </namespace>
</rules>
```

As an example, the following SGML DTD portion is considered:

```
<!ELEMENT section - - (title?, (#PCDATA | section)*) +(para)>
<!ELEMENT title - - (#PCDATA| footnote)* >
<!ELEMENT para - - (#PCDATA | footnote)* >
<!ELEMENT footnote - - (#PCDATA | para)* -(footnote) >
```

The SGML DTD analyzer 50 suitably processes the above SGML DTD portion to produce the following portion of the specially constructed XML schema 30 (namely, a RelaxNG specification written using the so-called "compact syntax"):

```
namespace sgml = "http://SGML"
namespace ns-1 = "http://NS-1"
namespace ns-2 = "http://NS-2"
start=section | para1
section=element sgml:section { title?, (text | section)* }
title = element sgml:title { (text| ftnt)* }
para1 = element ns-1:para { (text | ftnt)* }
para2 = element ns-2:para { (text | ftnt)* }
ftnt = element sgml:footnote { (text | para2)* }
```

To continue the example, the following portion of an illustrative SGML document 10 is considered:

```
<section>
  <title>
    Just a test
    <footnote>
      <para>This para will stay attached<para>
    </footnote>
  </title>
```

```
    <para>this para will be detached <para>
<section>
```

The SGML to XML translator 22 suitably translates this SGML document portion to form the translated document portion set forth below, where the tags are indeed members of three different namespaces:

```
<sgml:section>
    <sgml:title>
        Just a test
        <sgml:footnote>
            <ns-2:para>This para will stay attached</ns-2:para>
        </sgml:footnote>
    </sgml:title>
    <ns-1:para>this para will be detached </ns-1:para>
</sgml:section>
```

The NVDL preprocessor suitably constructs two tree fragments called #root and #anchor1 with #anchor1 no longer included in the #root fragment:

```
#root:
<sgml:section>
    <sgml:title>
        Just a test
        <sgml:footnote>
            <ns-2:para>This para will stay attached</ns-2:para>
        </sgml:footnote>
    </sgml:title>
</sgml:section>
#anchor1:
<ns-1:para>this para will be detached </ns-1:para>
```

When applying the NVDL schema of figure to the fragment #root, it will be successfully validated through the RelaxNG specification "section.rnc" starting from tag <sgml:section>, whereas the fragment #anchor1 will be passed through the same RelaxNG specification and successfully validated starting from tag <ns-1:para>.

As described herein, it is advantageous to use the XML namespace mechanism and associated validation languages such as NVDL or NRL to handle the complexity of inclusion tree constraints. As an alternative, some XML schema languages such as RelaxNG are sufficiently expressive to enable using another approach, in which a more complex schema is derived to capture the combinatorial power of SGML inclusion trees. Such a schema is suitably based on the interleave operator (order insensitive combinator), propagated to all descendant content model implied in the inclusion. As any descendant element can also be used in any other context where the inclusion does not hold, then each such content model is suitably duplicated as often as such context occurs. This alternative approach has substantial complexity which can be problematic in terms of efficiency and readability when dealing with large SGML DTDs such as those typically used in the aeronautic industries.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An SGML validation system comprising:
an XML validation engine;
a translator configured to convert an SGML document to a translated XML document using a p-isomorphic translation;
an XML schema against which the XML validation engine validates the translated XML document, the XML schema configured such that errors detected by the validation of the translated XML document correspond to SGML errors in the SGML document; and
a report generator configured to generate an error report identifying SGML errors corresponding with errors detected by the validation and linking the identified SGML errors with corresponding locations in the SGML document;
wherein the XML validation engine, the translator, and the report generator are embodied as a digital processing device.

2. The SGML validation system as set forth in claim 1, wherein the translator is configured to convert the SGML document to the translated XML document with the translated XML document having a tree structure equivalent to a tree structure of the SGML document, and the report generator links the identified SGML errors with corresponding locations in the SGML document by the tree structure equivalence.

3. The SGML validation system as set forth in claim 1, wherein the XML schema comprises:
a first XML schema component, errors detected by validation against the first XML schema component corresponding to violations of constraints defined in an SGML DTD associated with the SGML document; and
a second XML schema component, errors detected by validation against the second XML schema component corresponding to violations of a set of business rules.

4. The SGML validation system as set forth in claim 3, wherein the validation engine validates the translated XML document in a cascade process first against the first XML schema component and second against the second XML schema component.

5. The SGML validation system as set forth in claim 1, wherein the XML schema comprises:
an exclusion tree schema component, an error detected by validation against the exclusion tree schema component corresponding to an occurrence in the SGML document of a sub-tree that is excluded by an SGML DTD associated with the SGML document.

6. The SGML validation system as set forth in claim 1, further comprising:
a user interface having a display on which a user can view the error report.

7. The SGML validation system as set forth in claim 1, further comprising:
an SGML DTD analyzer configured to generate at least a portion of the XML schema from an SGML DTD.

8. The SGML validation system as set forth in claim 1, further comprising:
an business rules analyzer configured to generate at least a portion of the XML schema from a set of business rules.

9. The SGML validation system as set forth in claim 1, wherein the XML schema comprises one or more of (i) an XML DTD, (ii) a Schematron schema, (iii) a RelaxNG schema, and (iv) an NVDL schema.

10. The SGML validation system as set forth in claim 1, wherein the SGML validation system does not include an SGML validation engine configured to validate the SGML document against an SGML DTD.

11. An SGML validation process comprising:
   translating an SGML document having a tree structure using a p-isomorphic translation to generate a translated XML document having a corresponding tree structure;
   validating the translated XML document against an XML schema configured such that errors detected by the validating correspond to SGML errors in the SGML document;
   identifying SGML errors corresponding with errors detected by the validating; and
   linking the identified SGML errors with corresponding locations in the SGML document based on the correspondence of the tree structures of the SGML document and the translated XML document.

12. The SGML validation process as set forth in claim 11, further comprising:
   displaying a report associating the identified SGML errors and the corresponding locations in the SGML document.

13. The SGML validation process as set forth in claim 11, further comprising:
   generating at least a portion of the XML schema from an SGML DTD with which the SGML document is intended to conform.

14. The SGML validation process as set forth in claim 11, further comprising:
   generating the XML schema from an SGML DTD with which the SGML document is intended to conform and from additional SGML rules which the SGML document is intended to conform that are defined elsewhere than the SGML DTD.

15. The SGML validation process as set forth in claim 11, wherein the validating comprises:
   validating the translated XML document against a first XML schema configured such that errors detected by the validating against the first XML schema correspond to violations of constraints defined in an SGML DTD; and
   validating the translated XML document against a second XML schema configured such that errors detected by the validating against the second XML schema correspond to violations of constraints defined in a set of business rules.

16. An non-transitory electronic storage medium storing instructions executable to perform an SGML validation process comprising:
   translating an SGML document to generate a translated XML document wherein the SGML document has a tree structure and the translating generates the translated XML document with an equivalent tree structure using a p-isomorphic translation;
   validating the translated XML document against an XML schema configured such that errors detected by the validating correspond to SGML errors in the SGML document;
   identifying SGML errors corresponding with errors detected by the validating; and
   displaying a report indicating the identified SGML errors.

17. The non-transitory electronic storage medium as set forth in claim 16, wherein the displaying further comprises:
   displaying an association of the identified SGML errors with corresponding locations in the SGML document determined based on the equivalence of the SGML and translated XML document tree structures.

18. The non-transitory electronic storage medium as set forth in claim 16, wherein stored instructions are executable to perform an SGML validation process further comprising:
   generating the XML schema or a component of the XML schema from an SGML DTD with which the SGML document is intended to conform.

19. The non-transitory electronic storage medium as set forth in claim 16, wherein stored instructions are executable to perform an SGML validation process further comprising:
   generating the XML schema from an SGML DTD with which the SGML document is intended to conform and from additional SGML rules which the SGML document is intended to conform that are defined elsewhere than the SGML DTD.

20. The non-transitory electronic storage medium as set forth in claim 16, wherein the electronic storage medium further stores the XML schema.

* * * * *